US007948498B1

(12) United States Patent
Minkin

(10) Patent No.: US 7,948,498 B1
(45) Date of Patent: May 24, 2011

(54) EFFICIENT TEXTURE STATE CACHE

(75) Inventor: Alexander L. Minkin, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 621 days.

(21) Appl. No.: 11/549,566

(22) Filed: Oct. 13, 2006

(51) Int. Cl.
*G06T 11/40* (2006.01)
(52) U.S. Cl. .......................... 345/552; 345/557
(58) Field of Classification Search .......... 345/501–506, 345/519–522, 530–574
See application file for complete search history.

(56) References Cited

U.S. PATENT DOCUMENTS

| 5,920,326 | A * | 7/1999 | Rentschler et al. ........... 345/503 |
| 6,115,047 | A * | 9/2000 | Deering ........................ 345/422 |
| 6,209,020 | B1 * | 3/2001 | Angle et al. .................. 718/108 |
| 6,362,828 | B1 * | 3/2002 | Morgan ........................ 345/582 |
| 6,426,753 | B1 * | 7/2002 | Migdal ........................ 345/506 |
| 6,483,516 | B1 * | 11/2002 | Tischler ....................... 345/552 |
| 6,618,053 | B1 * | 9/2003 | Tanner ......................... 345/552 |
| 6,629,188 | B1 * | 9/2003 | Minkin et al. .................... 711/3 |
| 6,762,763 | B1 * | 7/2004 | Migdal et al. ................. 345/506 |
| 6,778,181 | B1 * | 8/2004 | Kilgariff et al. .............. 345/582 |
| 6,781,588 | B2 * | 8/2004 | Margittai et al. ............. 345/535 |
| 6,801,207 | B1 * | 10/2004 | Tischler et al. ............... 345/557 |
| 6,825,848 | B1 * | 11/2004 | Fu et al. ........................ 345/557 |
| 6,842,180 | B1 * | 1/2005 | Maiyuran et al. ............. 345/541 |
| 6,924,811 | B1 * | 8/2005 | Minkin ......................... 345/552 |
| 6,947,053 | B2 * | 9/2005 | Malka et al. .................. 345/582 |
| 7,336,284 | B2 * | 2/2008 | Morein et al. ................ 345/552 |
| 7,348,988 | B2 * | 3/2008 | Xu ................................ 345/557 |

OTHER PUBLICATIONS

Mark et al., Cg: A System for Programming Graphics Hardware in a C-like Language, International Conference on Computer Graphics and Interactive Techniques, ACM SIGGRAPH 2003, Jul. 2003.*

* cited by examiner

*Primary Examiner* — Xiao M Wu
*Assistant Examiner* — Charles Tseng
(74) *Attorney, Agent, or Firm* — Kilpatrick Townsend & Stockton LLP

(57) ABSTRACT

Circuits, methods, and apparatus that store a large number of texture states in an efficient manner. A level-one texture cache includes cache lines that are distributed throughout a texture pipeline, where each cache line stores a texture state. The cache lines can be updated by retrieving data from a second-level texture state cache, which in turn is updated from a frame buffer or graphics memory. The second-level texture state cache can prefetch texture states using a list of textures that are needed for a shader program or program portion.

20 Claims, 12 Drawing Sheets

EFFICIENT TEXTURE STATE CACHE

CROSS-REFERENCES TO RELATED APPLICATIONS

This application is related to copending U.S. patent application Ser. No. 10/696,848, titled Flexible and Inexpensive Method for Processing High Numbers of Independent Textures In a 3-D Graphics Pipeline, filed Oct. 30, 2003, which is incorporated by reference.

BACKGROUND

The present invention relates generally to storing texture state information, and more particularly to efficiently storing texture state information for use by a texture pipeline.

The realism and quality of graphics images has increased dramatically the last few years. Much of this increase has been made possible by an increase in the number of textures used in forming these graphics images.

Textures provide surface patterns and colors for objects in a graphic image. Textures are often processed using one or more texture pipeline circuits in a graphics processor or other appropriate circuit. A texture pipeline typically includes a number of pipeline stages.

Textures are described using a number of texture states. Various texture states include characteristics of the texture and provide instructions to a texture pipeline regarding the processing of the texture. Texture states are used by the pipeline stages in the texture pipeline as the texture pipeline processes texture information.

Conventionally, texture states are provided to a texture pipeline along with texture requests, state updates, and other information. These texture states are then passed through a texture pipeline along with their corresponding textures. Unfortunately, these texture states are quite large. Passing them through the texture pipeline consumes die area for storage circuits and routing, and increases device power dissipation as well. Also, as described above, the number of textures needed to generate a graphics image is rapidly increasing. Handling this increased number of textures further exacerbates these problems.

Accordingly, what is needed are circuits, methods and apparatus that provide efficient storage of a large number of texture states for use by texture pipelines.

SUMMARY

Accordingly, embodiments of the present invention provide circuits, methods, and apparatus that store a large number of texture states in an efficient manner. An exemplary embodiment of the present invention provides a texture cache having cache lines that are distributed throughout a texture pipeline, where each cache line stores a texture state. The cache lines can be updated by retrieving data from a second-level texture state cache, which in turn is updated from a frame buffer or graphics memory. In order to hide the latency associated with data retrievals from the graphics memory, the second-level texture state cache can prefetch texture states based on a list of textures that are needed for a shader program or program portion.

A specific embodiment of the present invention provides a number of texture pipelines, each texture pipeline including a texture state cache having a number of texture state cache lines. Each cache line stores texture states for one texture and is distributed throughout a texture pipeline.

Specifically, each texture pipeline includes a number of pipeline stages. Each of these pipeline stages can include registers or other storage circuits that store portions of one or more texture states for a number of textures. Each pipeline stage stores those portions of the texture states that are needed by that particular stage. Some texture state portions may be needed by more than one pipeline stage; these can be stored redundantly in those pipeline stages. In this way, each texture state is stored in a cache line that is distributed throughout the texture pipeline in an efficient manner, thereby reducing routing complexity.

Another specific embodiment of the present invention includes a second-level cache. This second-level cache can supply texture state cache lines for the texture state cache in the various texture pipelines. The second-level cache can retrieve texture states from a frame buffer, graphics, system, or other memory as needed.

In this embodiment of the present invention, the level-two cache can be preloaded with texture states after receiving an instruction that includes texture identification information listing the textures that will be needed by a shader program, program portion, or by other circuit or software module. Various embodiments of the present invention may incorporate one or more of these or the other features described herein.

A better understanding of the nature and advantages of the present invention may be gained with reference to the following detailed description and the accompanying drawings.

DESCRIPTION OF EXEMPLARY EMBODIMENTS

Figure 1:
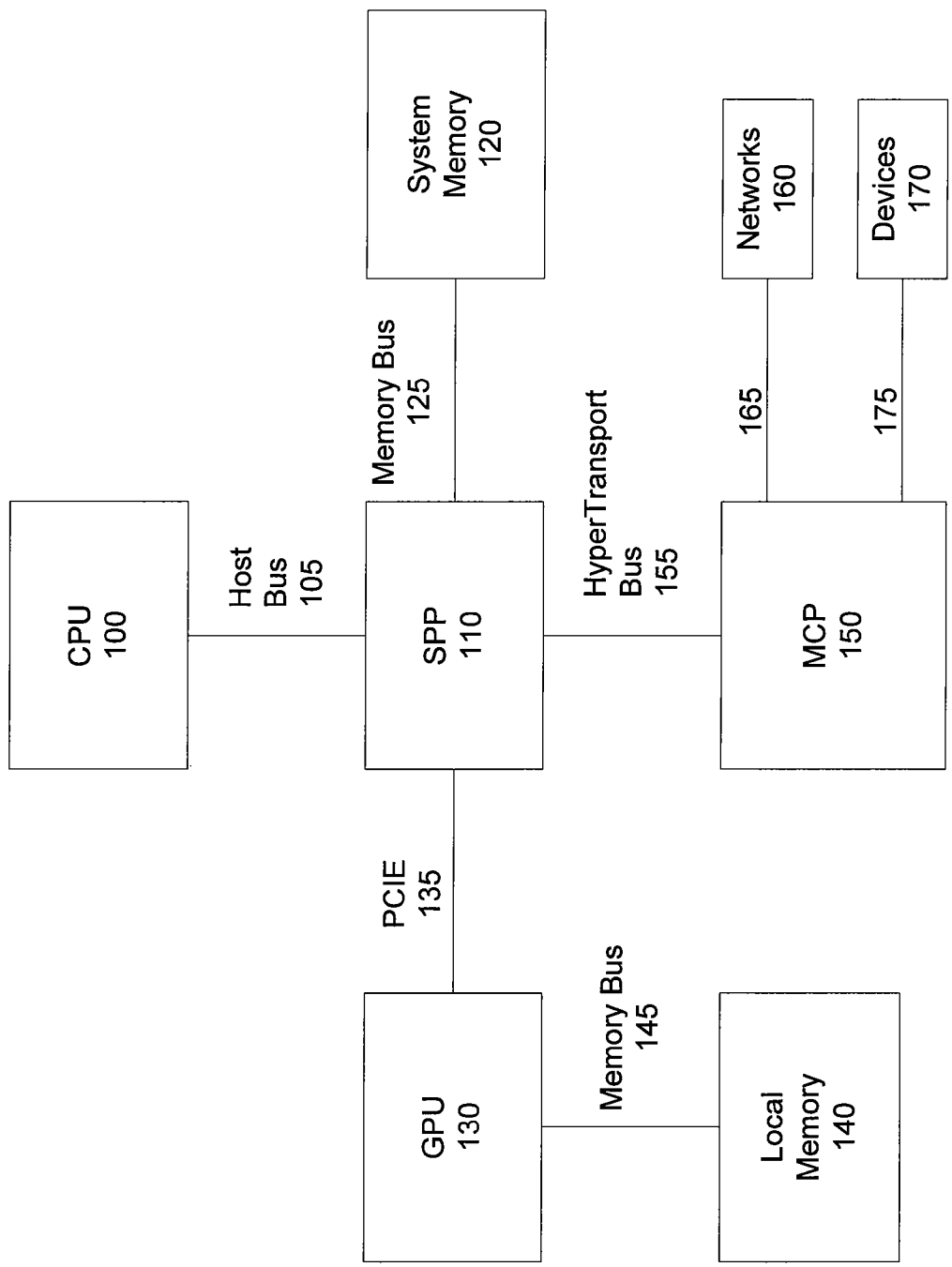
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, frame buffer, local, or graphics memory 140, MCP 150, networks 160, and internal and peripheral devices 170.

The CPU 100 connects to the SPP 110 over the host bus 105. The SPP 110 is in communication with the graphics processing unit 130 over an advanced graphics port (AGP) or peripheral component interconnect express (PCIE) bus 135. The SPP 110 reads and writes data to and from the system memory 120 over the memory bus 125. The MCP 150 communicates with the SPP 110 via a high-speed connection such as a HyperTransport bus 155, and connects network 160 and internal and peripheral devices 170 to the remainder of the computer system. The graphics processing unit 130 receives data over the AGP or PCIE bus 135 and generates graphic and video images for display over a monitor or other display device (not shown). The graphics processing unit 130 may make use of a frame buffer or graphics memory 140—via the memory bus 145—as well as the system memory 120.

The CPU 100 may be a processor, such as those manufactured by Intel Corporation, Advanced Micro Devices, or other supplier, and are well-known by those skilled in the art. The SPP 110 and MCP 150 are commonly referred to as a chipset. The memory 120 is often a number of dynamic random access memory devices arranged in a number of the dual in-line memory modules (DIMMs). The graphics processing unit 130, SPP 110, and MCP 150 are preferably manufactured by NVIDIA Corporation of Santa Clara, Calif.

Embodiments of the present invention may be used to improve the graphics processing unit 130. Also, other systems are improved by the incorporation of embodiments of the present invention. For example, the GPU 130 and SPP 110 may be combined as an integrated graphics processor or IGP. This device is similarly improved by the incorporation of embodiments of the present invention. Moreover, other types of processors, such as video, audio, or general purpose processors, and other types of processors and circuits may be improved by the incorporation of embodiments of the present invention. Also, while embodiments of the present invention are well suited to texture state storage, other types of data in graphics, video, audio, or other applications may be similarly improved. Further, other types of circuits will be developed, or are currently being developed, and these may also be improved by the incorporation of embodiments of the present invention.

Much of the processing done in the above graphics processing circuits is performed by their texture pipeline circuits. These circuit process textures, as mentioned above, provide surface patterns and colors for objects in a graphics image. In order to process textures, the texture pipelines need texture state information. This information describes a texture and provides instructions to the pipeline regarding the way in which the texture is to be processed. Various portions of these texture states include information such as the format of the texture, how the texture is to be filtered, the address location of the texture, the address mode used, and other information.

In the past, one, two or three textures were all that was needed to be handled by a texture pipeline at any given time. However, there is a strong demand to improve the quality and realism of graphics images, thus more textures are needed. In particular, up to 128 textures are required by applications supported by embodiments of the present invention. Accordingly, embodiments of the present invention provide for the efficient storage of a large number of texture states for use by texture pipelines. An example is shown in the following figure.

Figure 2:
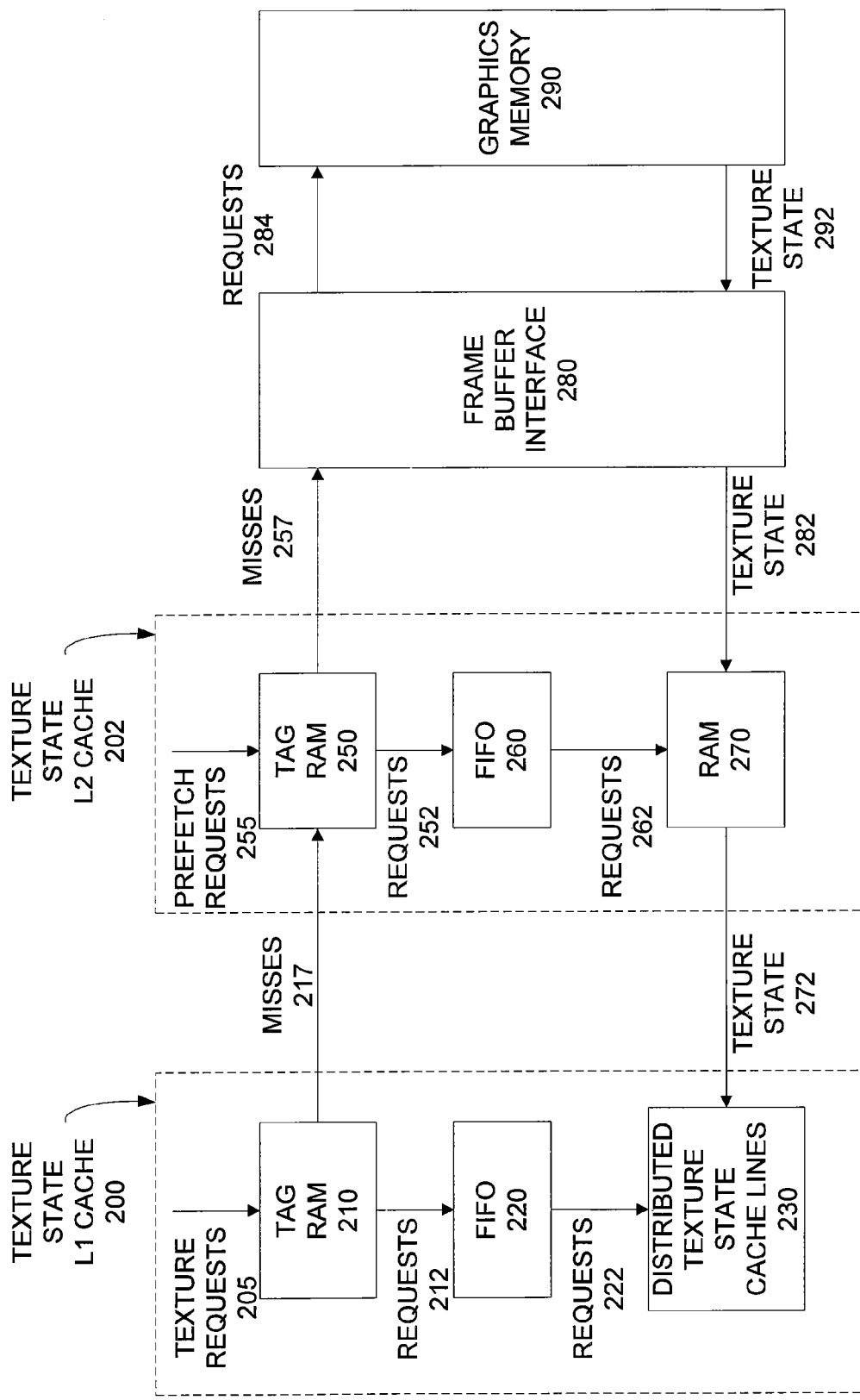
FIG. 2 is a block diagram of an apparatus for updating and storing texture state information according to an embodiment of the present invention.

FIG. 2 is a block diagram of an apparatus for updating and storing texture state information according to an embodiment of the present invention. This figure includes a level-one texture state cache 200, level-two texture state cache 202, frame buffer interface 280, and graphics memory 290. The level-one texture state cache 200 includes a tag RAM 210, FIFO 220, and a number of distributed texture state cache lines 230. The level-two texture state cache 202 includes a tag RAM 250, FIFO 260, and RAM 270. This figure, as with the other included figures, is shown for exemplary purposes and does not limit either the possible embodiments of the present invention or the claims.

Retrieving texture state stored in the graphics memory 290 for use by the texture pipeline can require up to hundreds of clock cycles. To avoid delays caused by this latency, embodiments of the present invention prefetch texture states from the graphics memory 290 for storage in the level-two cache RAM 270.

In this embodiment of the present invention, a shader (not shown) provides texture requests on line 205 to the level-one cache 200 and prefetch requests on line 255 to the level-two cache 202. The shader may send a prefetch request to the level-two cache 202 for the texture states to be used. In this case, the level-two cache 202 determines whether the texture states are stored in the level-two cache 202 or need to be retrieved from graphics memory. Alternately, the shader compares the texture states that will be needed by the texture pipeline to the texture states stored in the level-two cache 202 using the tag RAM 250. If a texture state that will be needed is absent from the level-two cache 202, a prefetch request is sent to the level-two cache 202. In either event, the level-two cache 202 retrieves missing texture states from the graphics memory 290 via the frame buffer interface 280 and stores it in the RAM 270.

Prefetching texture states in this way ensures that when a request is received by the level-one cache 200, the needed texture state will be available in either the distributed texture state cache lines 230 or the level-two cache RAM 270. This prevents delays that would otherwise be caused by the latency involved in retrieving texture states from the graphics memory 290.

Texture requests are received on line 205 by the tag RAM 210 in the level-one texture state cache 200 from the shader. The tag RAM determines whether the texture states needed by the requested textures are stored in the distributed texture state cache lines 230. If they are not, a request is sent on line 217 to the level-two texture state cache 202 requesting the texture states. The requests are also buffered by FIFO 220 in the texture state cache 200. FIFO 220 can be used to delay texture requests on line 212 while the needed texture states are retrieved from the level-two texture state cache 202.

The miss requests on line 217 are received by the tag RAM 250 in the level-two texture state cache 202. The tag RAM 250 determines whether the needed texture states are stored in RAM 270. Since texture states that are misses in the level-one distributed texture state cache lines 230 have been prefetched by the shader, the needed texture states should be in the RAM 270. Accordingly, in some embodiments of the present invention, miss requests from the level-one cache are not checked by the tag RAM 250.

The tag RAM 250 provides requests on line 252 to the RAM 270 via the FIFO 260, and the RAM 270 provides texture state information on line 272 to the level-one cache 200. Specifically, texture state information is provided on line 272 to the distributed texture state cache lines 230. Texture requests received on line 222 can then make use of the texture state information in the distributed texture state cache lines 230.

The tag RAMs 210 and 250 determine whether a texture state is available by checking the tag of a requested texture state against a list of tags of texture states held in their cache memories. In various embodiments of the present invention, these tags can be 8, 12, 16, or other appropriate numbers of bits, corresponding to 256, 4096, 64k, or other numbers of locations in the graphics memory 290.

In one embodiment of the present invention, these tags are offsets in a table of texture state locations. In various embodiments of the present invention, the texture states are stored in the graphics memory 290 in a contiguous block of memory locations, where each texture state is 16, 32, 64, or other numbers of bytes in size. In this way, the level-two texture state cache is able to translate the offset to a memory location by multiplying the offset by the size of a texture state and adding a memory starting address, where the memory starting address identifies the start of the contiguous block of memory. Also in various embodiments, the level-one texture state cache is large enough to hold 8, 16, 32, or other numbers of cache lines, while the level-two texture state cache has 32, 64, 128, or other numbers of cache lines.

Typically, each cache line holds one texture state. Alternately, they each may hold a portion of a texture state, a portion of several texture states, or more than one texture state. For example, as will be discussed below, in a specific embodiment of the present invention, there are two types of texture states, header and sampler texture states, and one cache line may hold a header state while another holds a sampler state.

A specific embodiment of the present invention uses two groups of distributed texture state cache lines 230. One group stores header states while the other holds sampler states. These two groups are independent and can be thought of as being two caches. In this embodiment of the present invention, a header state cache line cannot be used to store a sampler state, and a sampler state cache line cannot be used to store a header state. A given texture may make use of any header state and any sampler state. Also, in various embodiments of the present invention, each texture may use different texture states, or each texture state may be used by more than one texture. In this specific embodiment of the present invention, any texture state, header or sampler, can be stored at each location in the level-two cache RAM 270.

In other embodiments of the present invention, texture states may be stored using other methods, and they may be addressed by the level-two cache using other methods. For example, the level-one and level-two cache may use virtual addresses with one level of indirection, where physical addresses are found by the level-two cache using a translation lookaside buffer.

The graphics memory 290 may be a local memory, it may be system memory, or it may be another memory. Typically, this memory is on a separate device while the texture pipeline, level-one cache, level-two cache, and frame buffer interface are formed together on an integrated circuit.

Figure 3:
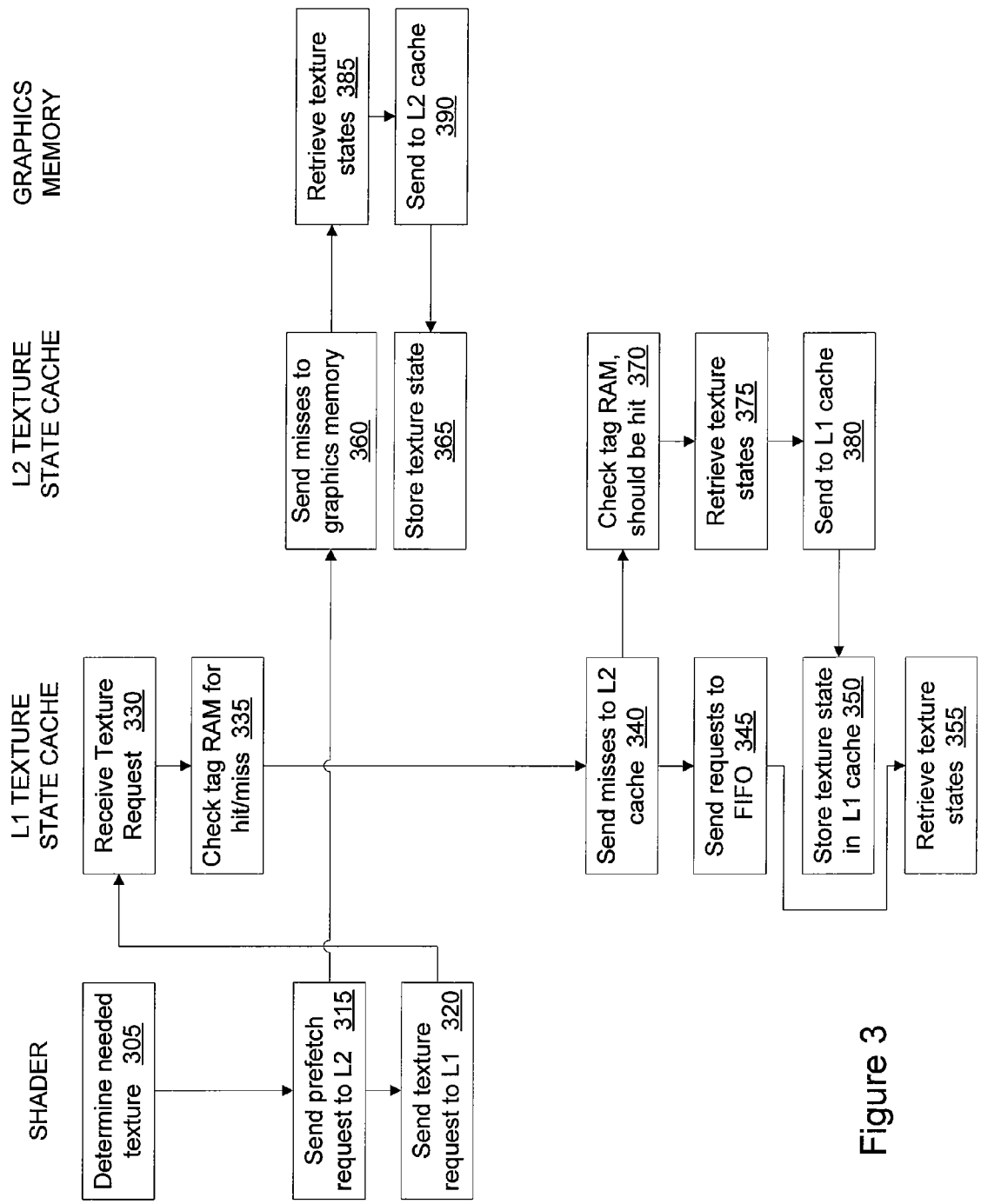
FIG. 3 is a flowchart illustrating the operation of the apparatus of FIG. 2.

FIG. 3 is a flowchart illustrating the operation of the apparatus of FIG. 2. The operations performed by a shader, level-one texture state cache, level-two texture state cache, and graphics memory are shown in corresponding columns. In this figure, a shader determines textures that will be needed by a shader program, for example, the shader may receive a list of textures that will be needed. The shader then sends prefetch requests to the level-two texture state cache. The prefetch requests identify texture states that will be needed by a texture pipeline. If these texture states are not stored in the level-two cache, they are prefetched from a graphics memory and stored in the level-two cache. The shader also sends texture requests to the texture pipeline. A level-one texture state cache receives requests for texture states needed by these texture requests. If the needed texture states are not stored in the level-one texture state cache, they are retrieved from the level-two texture state cache and the level-one texture state cache is updated.

Specifically, in act 305, a shader determines what textures will be needed by a shader program or shader program portion. The shader then sends a prefetch request to the level-two cache in act 315. In act 360, the level-two cache provides requests for any missing texture states to the graphics memory. In act 385, the texture states are retrieved and sent to the level-two cache in act 390. In act 365, the level-two cache is updated. A texture request is supplied to the level-one cache by the shader in act 320.

In act 330, the texture request is received by the level-one cache. In act 335, a tag RAM is checked to determine whether needed texture states are stored in the level-one texture state cache. Misses are sent to the level-two cache in act 340, and all requests are sent to a FIFO in act 345. In act 370, a tag RAM in the level-two texture state cache is checked to determine whether the needed texture state information is stored in the level-two texture state cache. Since the texture state has been prefetched, the data should be stored in the level-two cache. In act 375, the texture state or states are retrieved from the level-two cache, and sent to the level-one texture state cache in act 380. In act 350, texture states are received and stored in the level-one texture state cache. Texture requests emerge from the FIFO and corresponding texture states are retrieved in act 355.

In the above examples, the level-one texture state cache is not updated until texture requests are received by a texture pipeline. Accordingly, when a new image or image portion is to be processed, a great deal of texture state cache updating may be needed. Unfortunately, this updating may stall the texture cache pipeline. Again, in order to avoid this upstream stalling, an embodiment of the present invention employs prefetching in order to preload its level-two texture state cache. An example is shown in the following figure.

Figure 4:
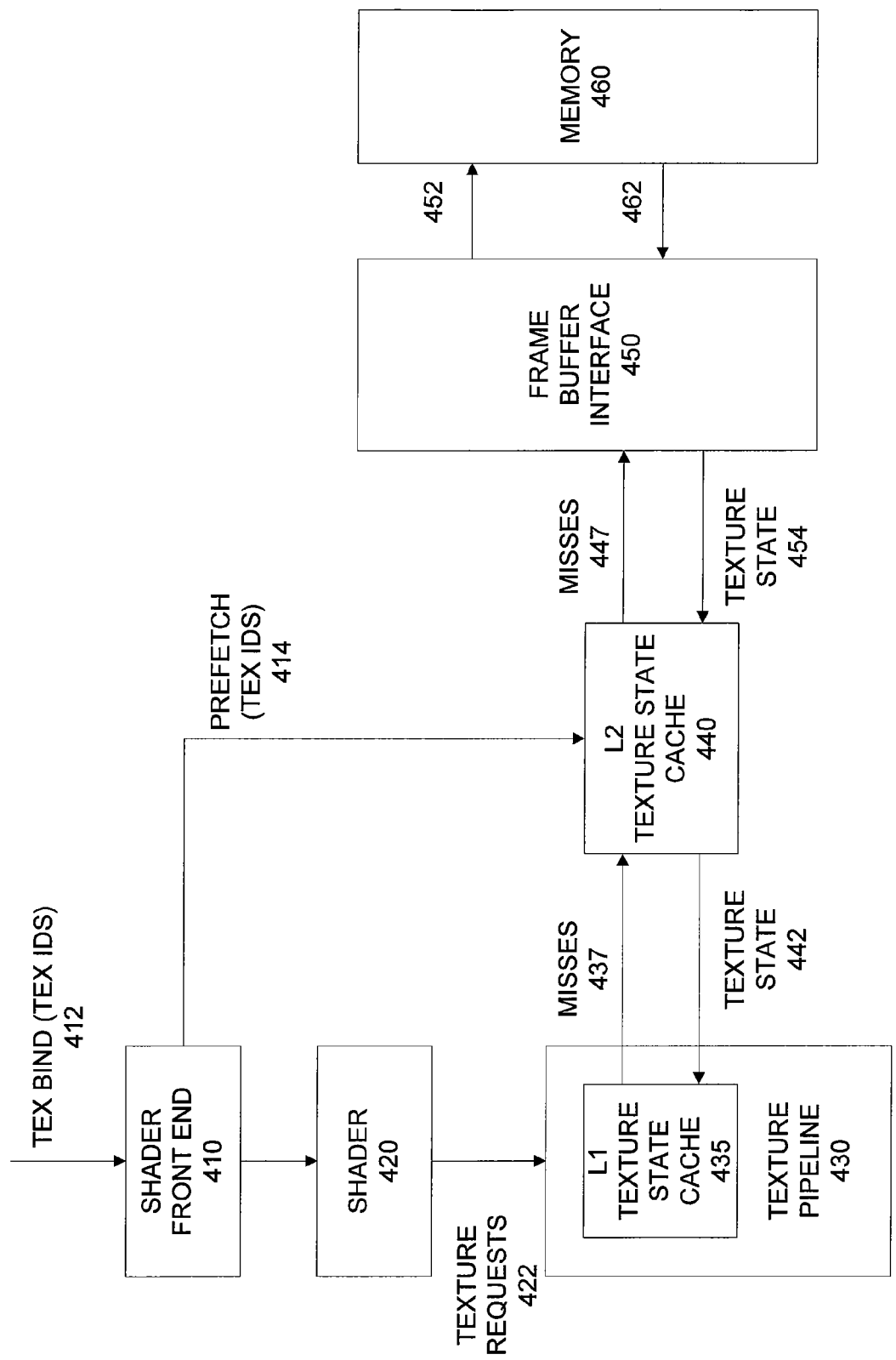
FIG. 4 is a block diagram of an apparatus for updating and storing texture states according to an embodiment of the present invention.

FIG. 4 is a block diagram of an apparatus for updating and storing texture states according to an embodiment of the present invention. This figure includes a shader front-end 410, shader 420, texture pipeline 430 including a texture state cache 435, level-two texture state cache 440, frame buffer interface 450, and memory 460.

The shader front-end 410 receives information regarding the textures that will be needed by an upcoming shader program or shader program portion. In a specific embodiment, this is referred to as a texture bind command, which is received on line 412. The texture bind command on line 412 specifies the identity of a texture that will be needed. The shader front-end 410 provides a prefetch instruction on line 412 to the level-two texture state cache 440. The level-two texture state cache 440 determines which of the needed texture states are currently stored in the level-two texture state cache 440, and which need to be retrieved from the memory 460. The level-two texture state cache 440 requests needed texture states from the frame buffer interface 450, which retrieves them from the memory 460 and provides them on line 454 to the level-two texture state cache 440. The level-two texture state cache 440 is thus preloaded with texture states that will be needed by the texture of requests received on line 422 by the texture pipeline 430. As texture requests on line 422 are received, the texture state cache 440 can retrieve the texture states that are not available in the level-one cache from the level-two cache 440.

The shader front-end 410 provides information to the shader 420, which provides texture requests on line 422 to the texture pipeline 430. The texture pipeline makes use of the texture state information stored in the level-one texture state cache 435. Again, if texture state information needed by texture requests on line 422 is not available in the level-one texture state cache 435, the texture states can be retrieved from the level-two cache 440.

In one embodiment of the present invention, in order to increase system performance, several texture pipelines are operated in parallel. An example of how texture states are prefetched and stored is shown in the following figures.

Figure 5:
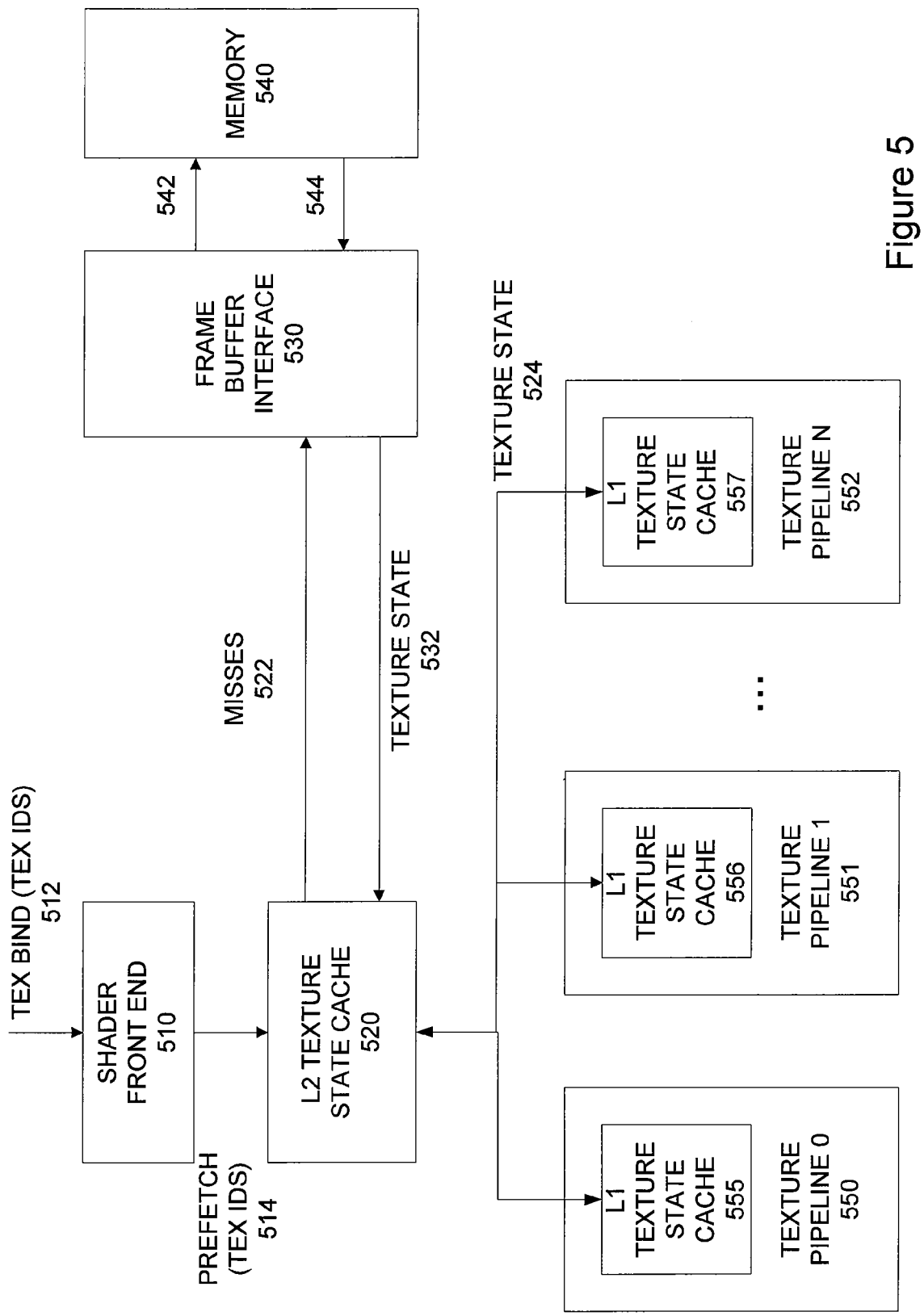
FIG. 5 is a block diagram illustrating an apparatus for updating and storing texture cache information in a number of texture pipelines.

FIG. 5 is a block diagram illustrating an apparatus for updating and storing texture cache information in a number of texture pipelines. This figure includes a shader front-end 510, level-two texture cache 520, frame buffer interface 530, memory 540, and texture pipelines 550, 551, and 552, which include texture caches 555, 556, and 557, respectively. Various embodiments of the present invention may employ different numbers of texture pipelines. Further, two or more texture pipelines may share a texture state cache. In a specific embodiment of the present invention, eight texture pipelines are used, each with a corresponding level-one texture state cache.

Again, a texture bind command specifying the identity of a texture that will be needed by a shader program or program portion is received on line 512 by a shader front-end 510. A prefetch command is provided on line 514 to a level-two texture state cache 520. The level-two texture state cache 520 determines which texture states it has and which need to be retrieved from the memory 540. The level-two texture state cache 520 provides requests on line 522 to the frame buffer interface 530 and receives texture state information on line 532. The level-two texture state cache can then update the level-one texture state caches 555, 556, and 557 as they request texture states.

Figure 6:
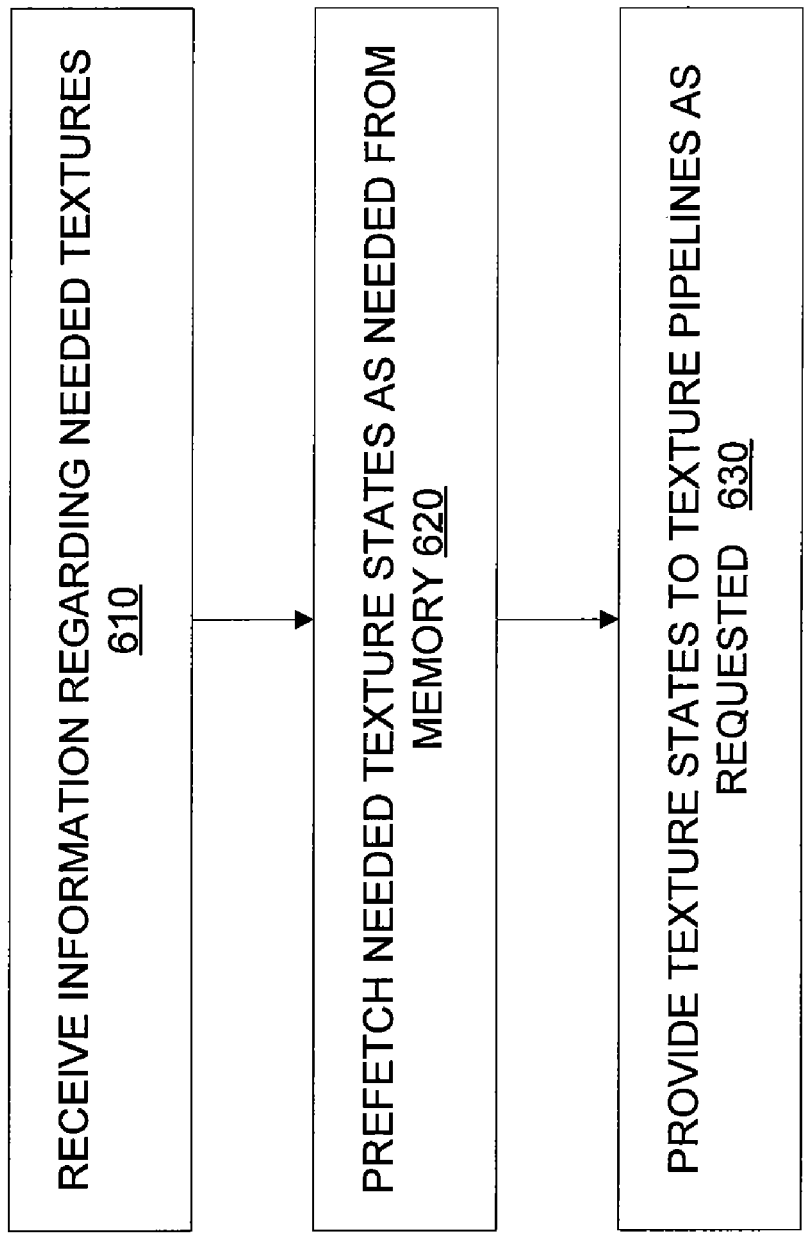
FIG. 6 is a flowchart illustrating the operation of the circuitry in FIG. 5.

FIG. 6 is a flowchart illustrating the operation of the circuitry in FIG. 5. Information regarding the textures that will be needed by a shader program or shader program portion is received in act 610. In act 620, texture states for these textures are prefetched from a memory. These texture states can then be provided to texture pipelines when requested in act 630.

Texture state information may be stored in a memory, such as an SRAM located in the texture pipeline. However, various stages in the texture pipeline require access to the information stored in the SRAM. Accordingly, a large amount of routing is required to distribute the texture states stored in the SRAM to the various pipeline stages. Alternately, texture state information may be passed from pipeline stage to pipeline stage along with its corresponding texture information. However, this requires a great deal of unnecessary and redundant data transfers.

Accordingly, an embodiment of the present invention stores texture state information needed by a pipeline stage in that pipeline stage. That is, if a particular pipeline stage requires a particular piece of texture state information, then that state information for each active texture is stored in the pipeline stage. Texture state information needed by two or more pipeline stages may be redundantly stored in each of these pipeline stages. This provides easy access to needed texture state information, really portions of texture states, by each pipeline stage, thus simplifying routing and reducing die area. Also, texture states enter the pipeline as texture state updates. Each pipeline stage passes texture state information to subsequent pipeline stages. However, since each stage only needs some of each texture state, only the portions of the texture state needed by subsequent pipeline stages needs to be passed from one pipeline stage to another. This reduces the amount of texture state information that is passed down the pipeline, particularly for later pipeline stages.

In the previous figures, texture state information is retrieved from a level-two cache or graphics memory as needed. A level-one cache line then stores texture state information needed for a particular texture. Specifically, the texture state information is stored among the various pipeline stages, that is, the cache lines for the level-one texture state cache are distributed among various pipeline stages in a texture pipeline. An example of such a texture pipeline is shown in the following figure.

Figure 7:
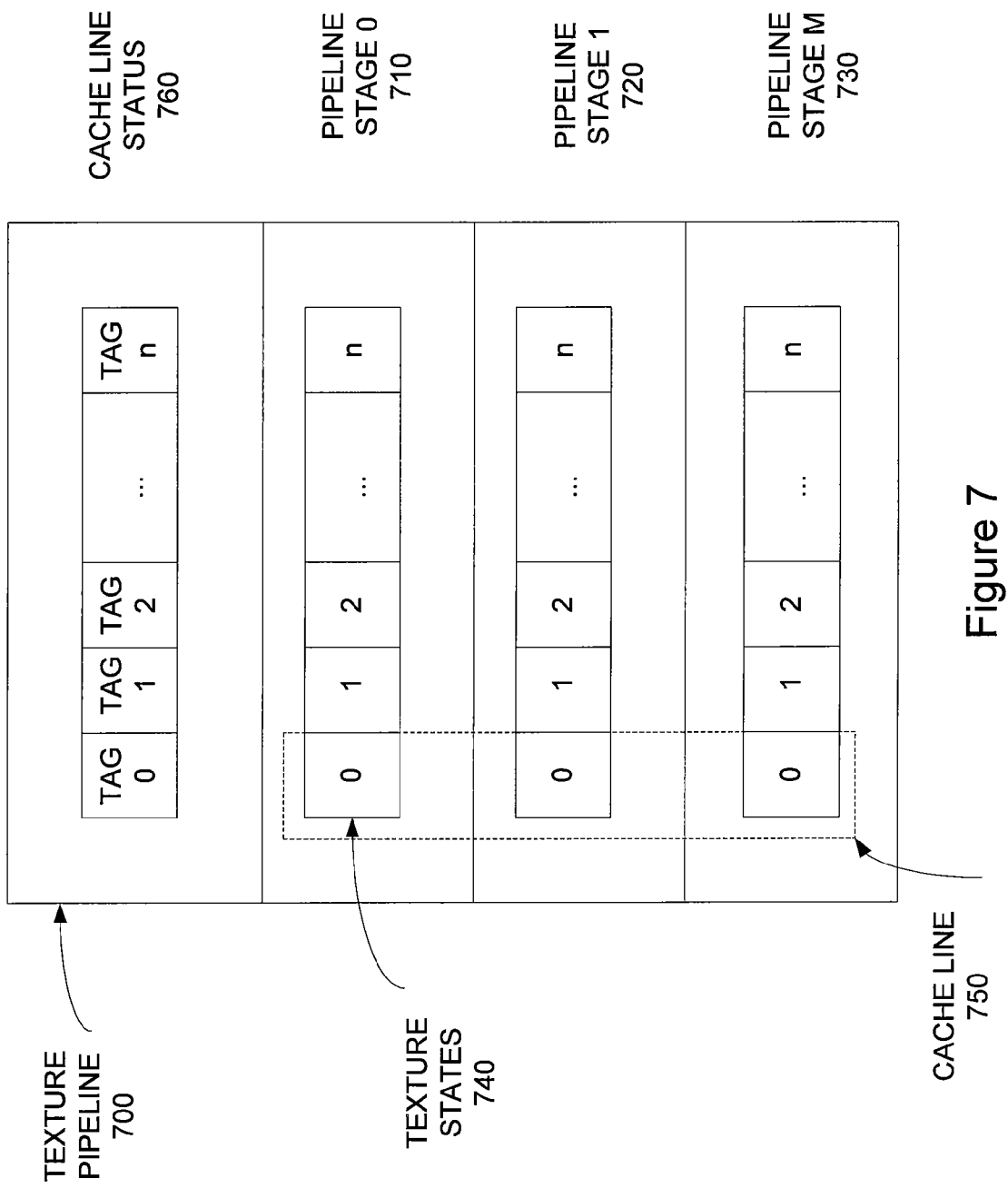
FIG. 7 illustrates a texture pipeline including multiple pipeline stages.

FIG. 7 illustrates a texture pipeline 700 including multiple pipeline stages 710, 720, and 730, and cache line status information 760. Each pipeline stage includes registers or other memory circuits that store texture states 740. Different texture states for textures 1 through "N" are stored in each pipeline stage. The texture state information is stored in cache lines 750, which are distributed among the various pipeline stages. The cache line status information 760 includes tags that identify the texture states stored in cache lines 750. These tags are used to identify whether a requested texture state is stored in a cache line, a hit, or needs to be retrieved from the level-two cache, a miss. The tags can be stored in registers or other memory circuits.

As mentioned above, a specific embodiment of the present invention employs two types of texture states, header states and sampler states. Each of these may be stored in cache lines. Other types of states may be added in the future, and these may be stored in cache lines as well. A specific embodiment of the present invention provides to groups of cache lines 750. One group stores header texture states, the other stores sampler texture states. In this embodiment, these two groups are separate cache lines; the sampler texture state cache lines are not used to store header texture states, and the header texture state cache lines are not used to store sampler texture states. A texture may utilize any one header texture state and any one sampler texture state. Also, in various embodiments of the present invention, each texture may use different texture states, or more than one texture may make use of each cached header and sampler texture state.

Header states generally include states that disclose the properties of a texture such as texture format, texture width and height, frame buffer address, and others. Sampler states generally include states that disclose how a texture is to be processed such as filtering, address mode, border color, and others. Again, each texture utilizes one header state and one sampler state, and these states can be mixed and matched for each texture. These states may be stored throughout the texture pipeline stages 710, 720, and 730.

In other embodiments of the present invention, the cache lines 750 may store texture states in a variety of ways. Again, each cache line 750 may store one texture state. In other embodiments, each cache line 750 may store more than one texture state. Alternately, each cache line may store only a portion of a texture state. In other embodiments of the present invention, each cache line 750 may store portions of more than one texture state.

In various embodiments of the present invention, each header and each sampler state may also be stored in the level-two cache and graphics memory as a separate texture state in a separate cache line. Each cache line in the level-two cache may store either a header or a sampler state. In another embodiment of the present invention, the level-two cache maintains separate header and sampler state tables, each with its own starting addresses.

The texture pipeline stages may also require state information referred to as global states. In a specific embodiment of the present invention, these global states are not stored and retrieve from a higher level of cache, but are provided to the texture pipeline via a shader or other appropriate circuit. An example of the texture pipeline including these global states is shown in the following figure.

Figure 8:
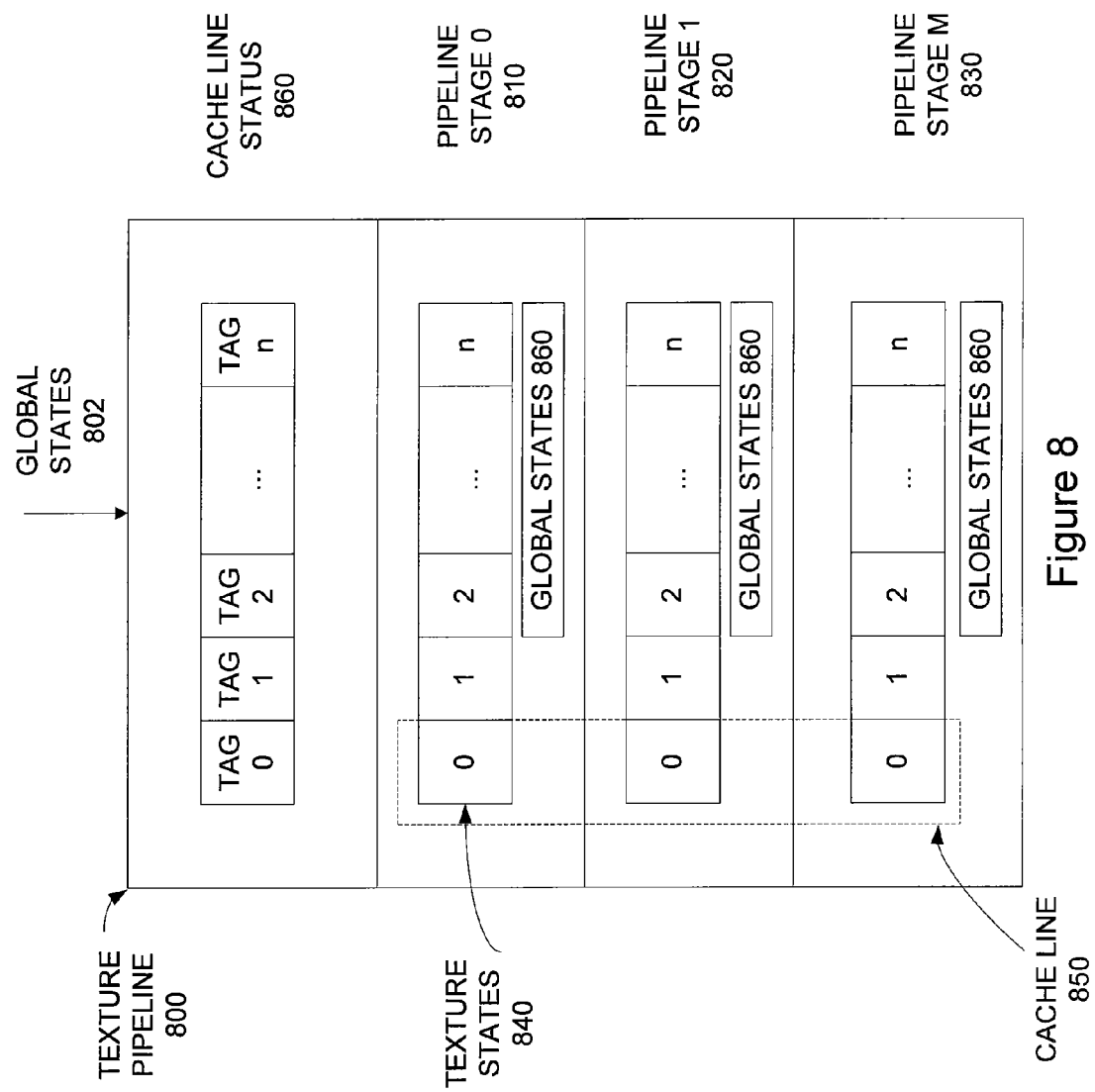
FIG. 8 is a diagram illustrating a texture pipeline including multiple pipeline stages, each including a number of texture states and global states.

FIG. 8 is a diagram illustrating a texture pipeline including multiple pipeline stages, each including a number of texture states and global states. In this example, portion of texture states and global states are included for each pipeline stage. In various embodiments of the present invention, each pipeline stage may include zero or one or more texture state portions, zero or one or more global states, or any combination thereof.

Global states are received by the texture pipeline 800 on line 802 from a shader (not shown). Different global states may be stored in each of the pipeline stages, and some global states may be stored in more than one pipeline stage. Again, cache lines 850 are distributed among the various pipeline stages.

Again, in an embodiment of the present invention, texture state information is stored in a level-two texture state cache in various cache lines. These cache lines each include texture state information for one texture. Data in the level-two cache lines are then written to level-one cache lines that are distributed among the various pipeline stages in a texture pipeline. This is illustrated in the following figures.

Figure 9:
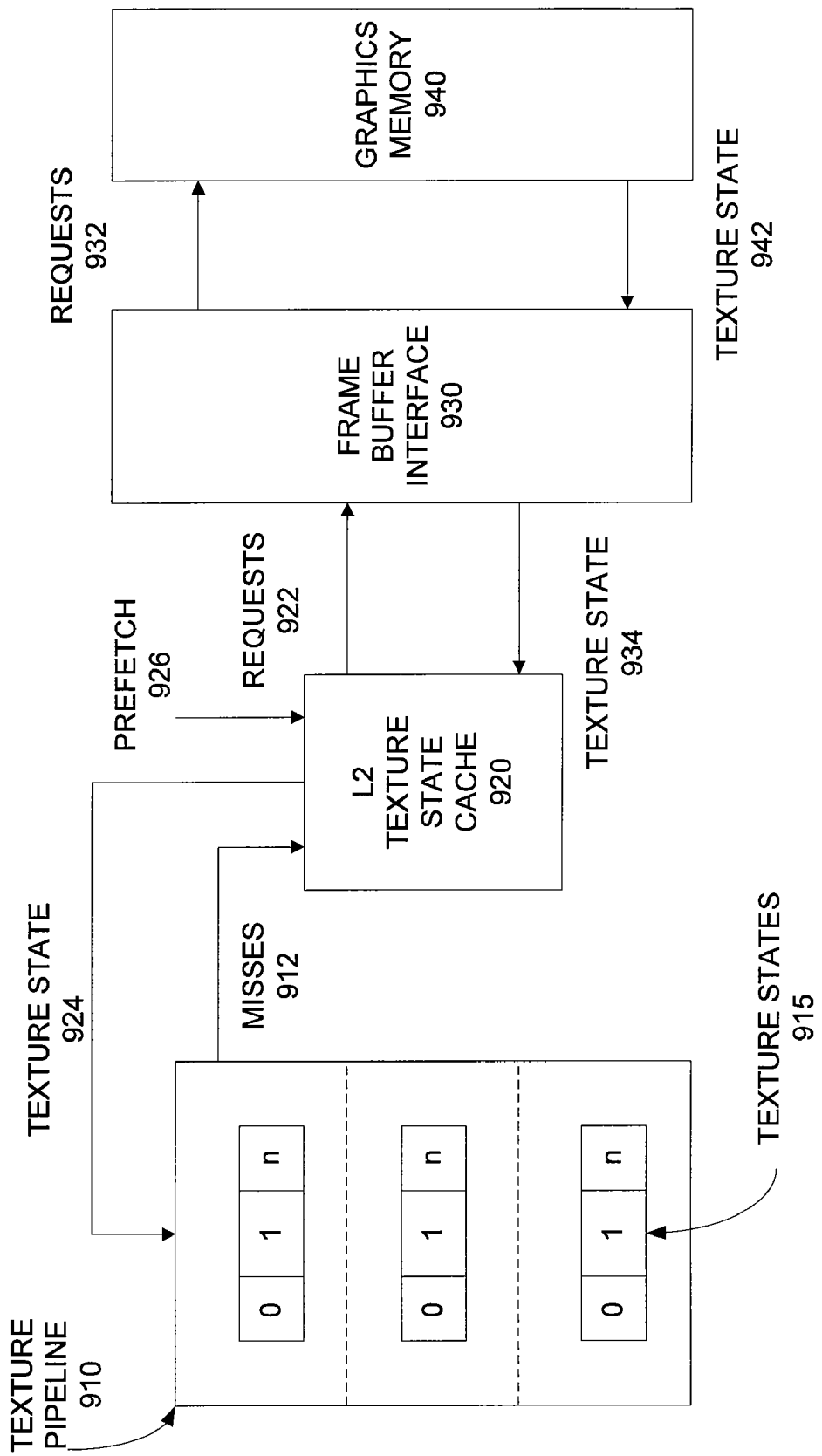
FIG. 9 is a block diagram of an apparatus for storing texture state information and distributed cache lines and a texture pipeline according to an embodiment of the present invention.

FIG. 9 is a block diagram of an apparatus for storing texture state information in distributed cache lines in a texture pipeline according to an embodiment of the present invention. This figure includes a texture pipeline 910, level-two texture state cache 920, frame buffer interface 930, and memory 940.

The texture pipeline 910 includes a number of pipeline stages, each including a portion of several texture states 915. Prefetch requests are received on line 926 by the level-two texture state cache 920. The level-two texture state cache 920 determines whether the texture state identified by the prefetch request is available in the level-two cache 920 or needs to be retrieved from system memory. The level-two texture state cache 920 requests missing texture states from the frame buffer interface on line 922 and receives texture state updates on line 934.

Texture state misses are provided by the texture pipeline 910 on line 912 and received by the level-two texture state cache 920. The level-two texture state cache provides texture state information on line 934 to the distributed cache lines in the texture pipeline 910. This data flow is shown in the following figures.

Figure 10A:
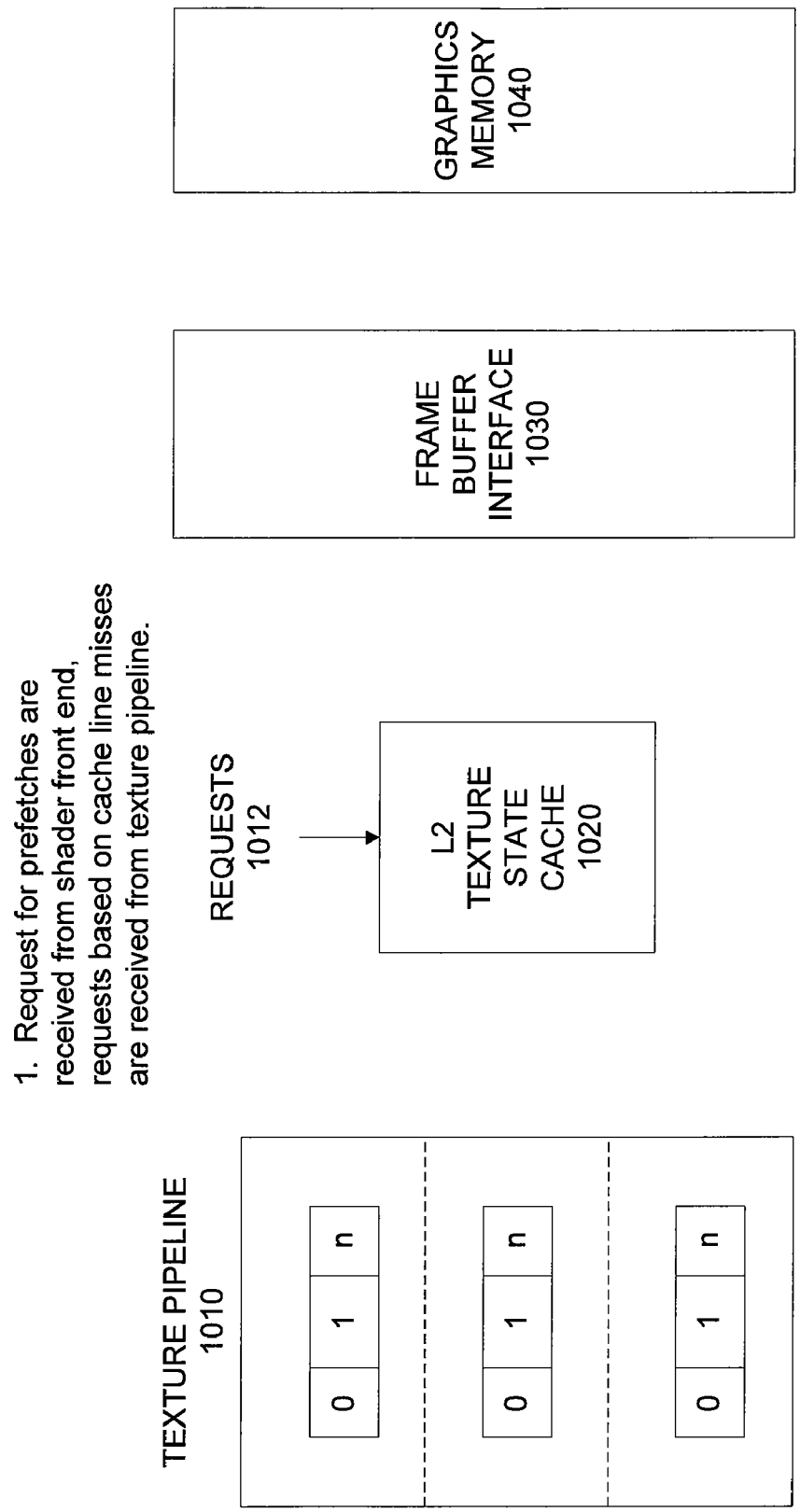
FIGS. 10A-10C illustrate a data flow during the operation of the circuit of FIG. 9.
Figure 10B:
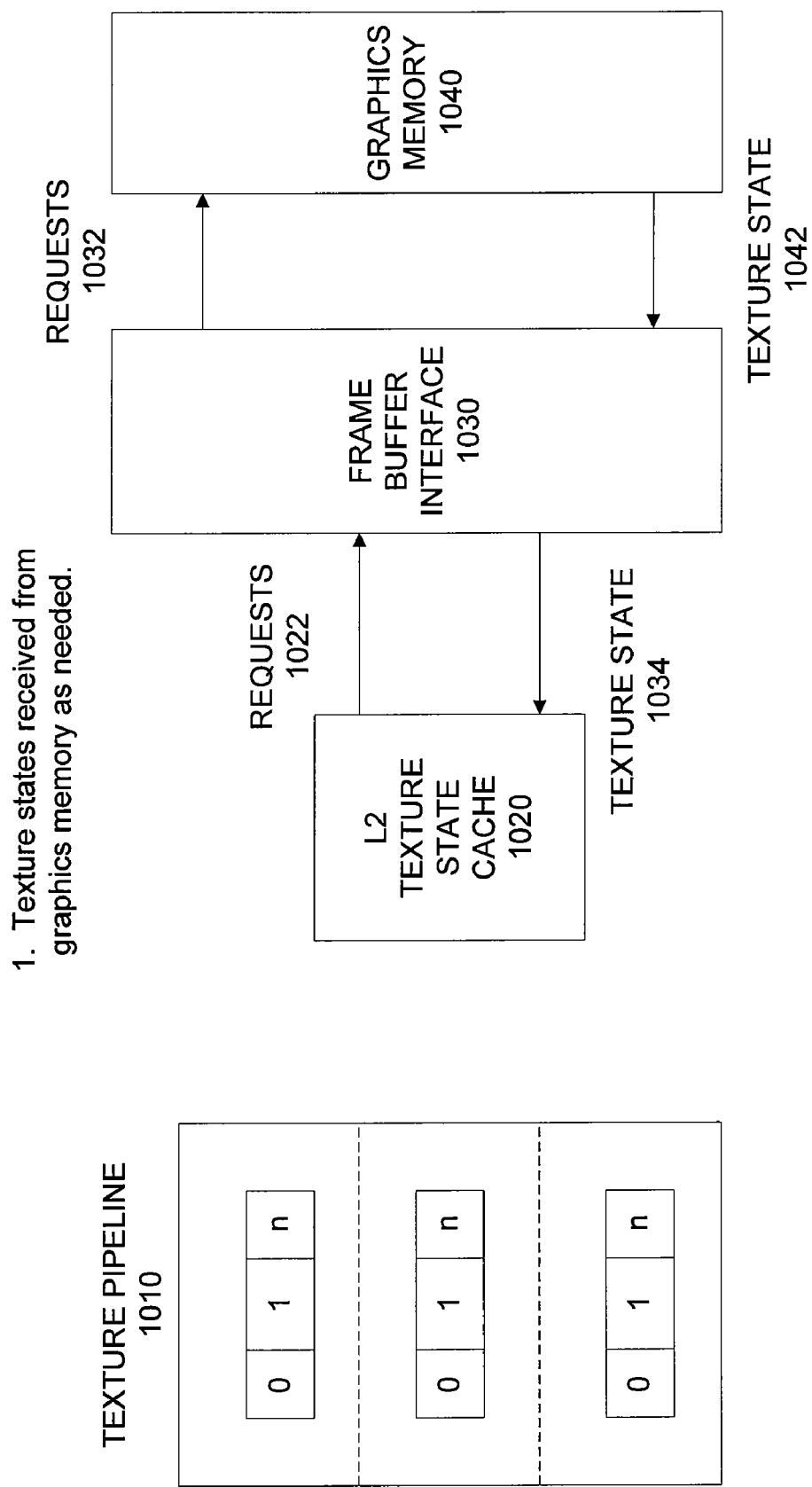
Figure 10C:
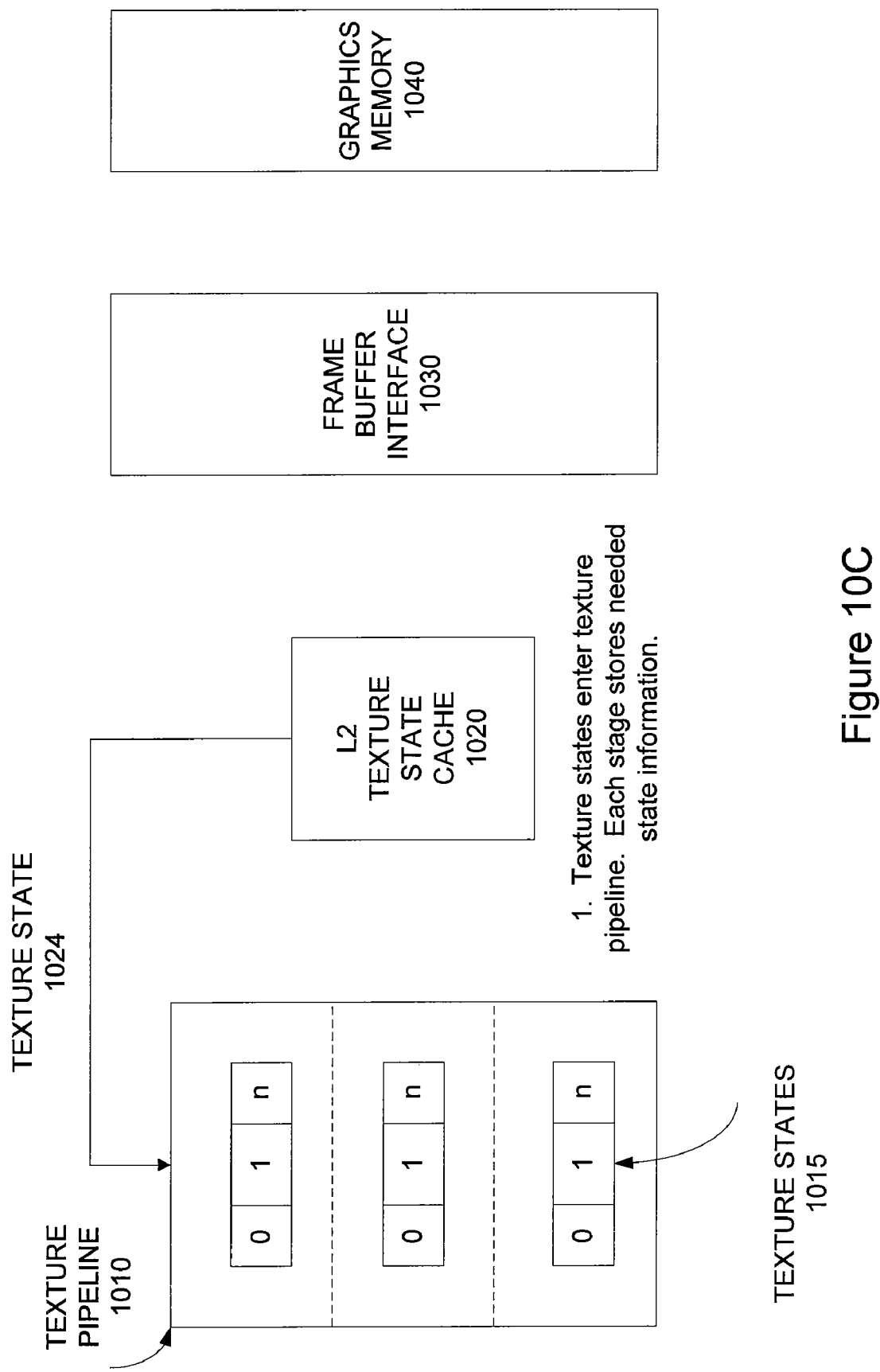

FIGS. 10A-10C illustrate a data flow during the operation of the circuit of FIG. 9. This figure includes a texture pipeline 1010, level-two texture state cache 1020, frame buffer interface 1030, and memory 1040. In FIG. 10A, prefetch requests are received from a shader and level-one cache line misses are received from the level-one cache.

In FIG. 10B, texture states requested by the prefetch requests but not available in the level-two cache are requested and received from the graphics memory 1040. Specifically, the level-two texture state cache 1020 provides requests for data on line 1022 to the frame buffer interface 1030. The frame buffer interface 1030 provides these requests on line 1032 to the memory 1040 and receives texture states in return on line 1042. The frame buffer interface 1030 provides texture states on line 1034 to the level-two texture state cache 1020.

In FIG. 10C, the texture states that are requested by a level-one cache line miss are stored in distributed level-one cache lines in the texture pipeline 1010. The level-two texture state cache 1020 provides texture states on lines 1024 to the texture state cache lines in the texture pipeline 1010. Specifically, the texture states on line 1024 enter the texture pipeline as texture state updates. The texture states are passed from pipeline stage to pipeline stage, with each stage storing one or more portions of the texture state. Again, the level-one texture state cache lines are distributed among the various pipeline stages in the texture pipeline 1010.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit, the integrated circuit including a texture pipeline comprising:
 a distributed cache comprising a plurality of cache lines, each of the plurality of cache lines to store a texture state in a plurality of storage elements distributed among a plurality of pipeline stages of the texture pipeline, the plurality of pipeline stages comprising:
 a first pipeline stage comprising:
  a first plurality of storage elements of the distributed cache to store a first portion of each of a plurality of texture states, such that less than the entire texture state for each of the plurality of texture states is stored in the first pipeline stage; and
 a second pipeline stage comprising:
  a second plurality of storage elements of the distributed cache to store a second portion of each of the plurality of texture states, such that less than the entire texture state for each of the plurality of texture states is stored in the second pipeline stage,
 wherein the first pipeline stage and the second pipeline stage are in the same texture pipeline.

2. The integrated circuit of claim 1 wherein the second pipeline stage further comprises a third plurality of storage elements to store the first portion of each of the plurality of texture states.

3. The integrated circuit of claim 1 wherein the second pipeline stage further comprises a third plurality of storage elements configure to store a first global state.

4. The integrated circuit of claim 1 wherein the first plurality of storage elements comprises a plurality of registers.

5. The integrated circuit of claim 1 wherein the integrated circuit further comprises:
 a second-level texture state cache coupled to the first plurality of storage elements and the second plurality of storage elements; and
 a frame buffer interface coupled to the second-level texture state cache.

6. The integrated circuit of claim 5 wherein the second-level texture state cache is configured to write texture state data to the first plurality of storage elements and the second plurality of storage elements, and the frame buffer interface is configured to retrieve texture state data from a memory.

7. The integrated circuit of claim 6 wherein the memory is external to the integrated circuit.

8. The integrated circuit of claim 1 wherein the integrated circuit is a graphics processing unit.

9. An integrated circuit comprising:
a first texture pipeline comprising a first-level texture state cache, the first-level texture state cache comprising a first number of cache lines to store texture states, wherein each of the first number of cache lines is distributed among a plurality of stages in the first texture pipeline, such that less than an entire texture state is stored in each of the plurality of stages;
a second-level texture state cache coupled to the first-level texture state cache, the second-level texture cache comprising a second number of cache lines; and
a frame buffer interface coupled to the second-level texture state cache,
wherein the second-level texture state cache is configured to receive requests for texture state data from the first-level texture state cache, to provide requests for texture state data to the frame buffer interface, to receive texture state data from the frame buffer interface, and to provide texture state data to the first-level texture cache.

10. The integrated circuit of claim 9 further comprising:
a plurality of texture pipelines, each comprising a first-level texture cache, each first-level texture cache coupled to the second-level texture cache,
wherein the second-level texture cache is further configured to receive requests for texture state data and to provide texture state data to each of the first-level texture caches.

11. The integrated circuit of claim 9 wherein the texture pipeline comprises:
a first pipeline stage comprising:
a first plurality of storage elements configured to store a first portion of each of a plurality of texture states for a plurality of textures; and
a second pipeline stage comprising:
a second plurality of storage elements configured to store a second portion of each of a plurality of second texture states for the plurality of textures.

12. The integrated circuit of claim 11 wherein each of the first number of cache lines in the first-level texture cache is configured to store texture state data.

13. The integrated circuit of claim 12 wherein the second pipeline stage further comprises a third plurality of storage elements configure to store a first global state.

14. The integrated circuit of claim 12 wherein the first plurality of storage elements comprises a plurality of registers.

15. The integrated circuit of claim 12 wherein the integrated circuit is a graphics processing unit.

16. A method of storing texture state data comprising:
receiving a request for a plurality of texture states with a second-level texture state cache;
requesting the plurality of texture states from a frame buffer interface using the second-level texture state cache;
receiving the plurality of texture states from the frame buffer interface using the second-level texture state cache;
storing the plurality of texture states in the second-level texture state cache;
receiving a request for one of the plurality of the texture states from a first-level texture cache using the second-level texture state cache;
providing the one of the plurality of the texture states to the first-level texture cache using the second-level texture state cache; and
storing the one of the plurality of texture states in a cache line, wherein the cache line is distributed among a plurality of pipeline stages in a texture pipeline,
wherein a first portion of the cache line is located in a first pipeline stage to store a first portion of the one of the plurality of texture states and a second portion of the one of the plurality of texture states is not stored in the first pipeline stage, and wherein a second portion of the cache line is located in a second pipeline stage to store the second portion of the one of the plurality of texture states and the first portion of the one of the plurality of texture states is not stored in the second pipeline stage, and
wherein the first pipeline stage and the second pipeline stage are in the same texture pipeline.

17. The method of claim 16 wherein the request for a plurality of texture states is received from a shader.

18. The method of claim 16 wherein the one of the plurality of the texture states is stored in a first cache line in the first-level texture cache.

19. The method of claim 18 wherein the first cache line is distributed among a plurality of pipeline stages in a texture pipeline.

20. The method of claim 16 wherein the first-level texture state cache, the second-level texture state cache, and the frame buffer interface are formed on an integrated circuit, the integrated circuit comprising a graphics processing unit.

* * * * *